Oct. 8, 1929.  E. C. MYERS  1,731,056
POWER STEERING MECHANISM
Filed Oct. 22, 1927   2 Sheets-Sheet 1
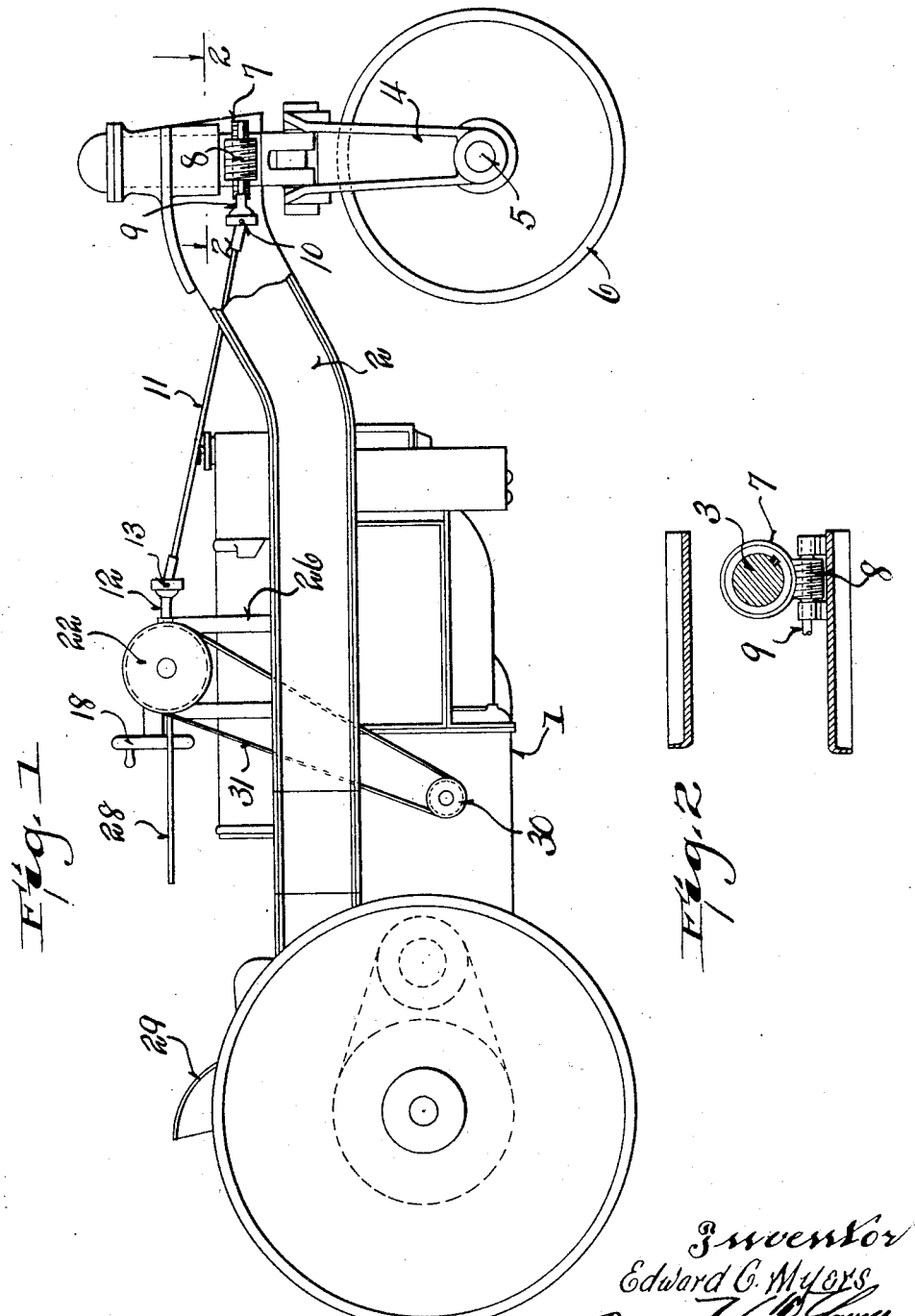
Inventor
Edward C. Myers Oct. 8, 1929.  E. C. MYERS  1,731,056
POWER STEERING MECHANISM
Filed Oct. 22, 1927    2 Sheets-Sheet 2

Inventor
Edward C. Myers
By
Attorney

Patented Oct. 8, 1929

1,731,056

UNITED STATES PATENT OFFICE

EDWARD C. MYERS, OF MILWAUKEE, WISCONSIN, ASSIGNOR TO WEHR COMPANY, OF MILWAUKEE, WISCONSIN

POWER STEERING MECHANISM

Application filed October 22, 1927. Serial No. 227,975.

This invention relates to power steering mechanism.

Objects of this invention are to provide a novel form of power steering mechanism which is adapted for use on implements attached to tractors, primarily, but which may obviously be used in other capacities.

Further objects of this invention are to provide a simple form of attachment which may be readily applied to existing machines without requiring any elaborate changes and which is so constructed that it cooperates with the conventional form of tractors and may be driven therefrom by simple means to steer the implement or apparatus either by hand or by power.

An embodiment of the invention is shown in the accompanying drawings in which:

Figure 1 is a side elevation of the apparatus with parts broken away;

Figure 2 is a fragmentary sectional view on the line 2—2 of Figure 1;

Figures 3, 4:
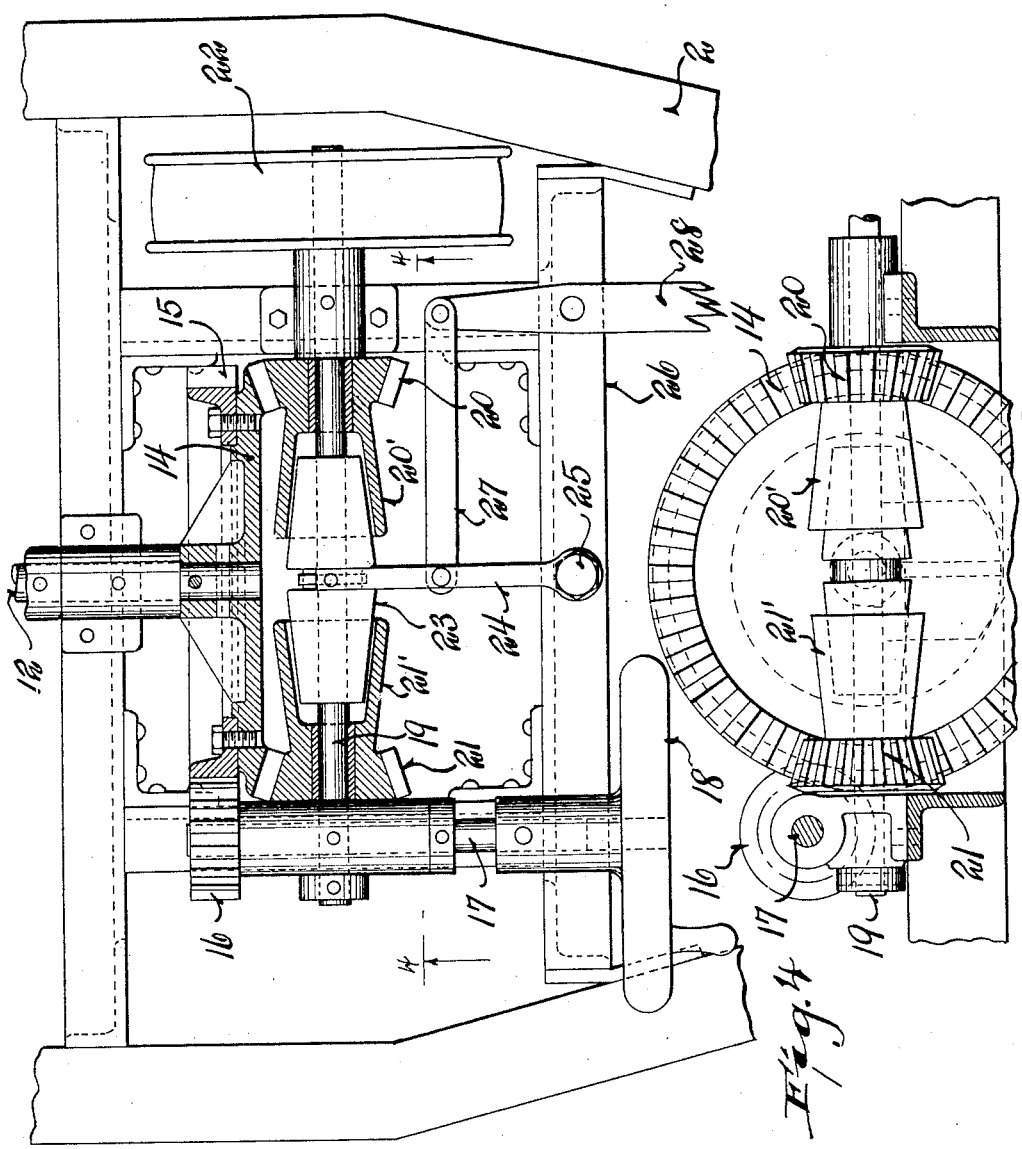
Figure 3 is a view showing the steering mechanism with parts in section.
Figure 4 is a sectional view on the line 4—4 of Figure 1.

Referring to the drawings, it will be seen that the device has been illustrated as applied to a tractor 1 which is equipped with road rolling mechanism although obviously it could be applied to other types of implements.

In the form shown, the conventional tractor has its front wheels removed and is positioned between a pair of side frame bars 2 which converge towards their front ends and carry the vertical axle or king pin 3 of a front yoke 4, such yoke carrying the front axle 5 of the front roller 6.

In applying this invention, the vertical shaft or king pin 3 has keyed thereto a worm wheel or segmental gear 7. This worm wheel meshes with a worm 8 carried by a short horizontal shaft 9. It is to be noted that the shaft is positioned between the front ends of the side frame bars. The shaft 9 is connected by means of a universal joint 10 with a diagonal upwardly and rearwardly extending shaft 11, the shaft 11 in turn being connected to a horizontal shaft 12 by means of the universal joint 13.

Referring to Figure 3, it will be seen that the horizontal shaft 12 is provided with a bevel gear 14 and also with a spur gear 15. The spur gear meshes with a pinion 16 which is rigidly carried by the shaft 17 of the hand wheel 18.

A transverse shaft 19 is provided with a pair of bevel pinions 20 and 21 loose thereon and meshing with the bevel gear 14. The shaft 19 is rigidly connected to a driven pulley 22. The shaft 19 has slidably splined thereon a double cone clutch member 23 which is operated by means of a forked lever 24. The lever 24 is pivoted, as indicated at 25, to a frame 26 hereinafter described.

It is to be noted also that the double cone 23 cooperates with either of the two conical clutch members 20′ and 21′ formed integrally with the bevel pinions 20 and 21, so that one or the other of the pinions may be operatively connected to the shaft 19, as desired, or else both may be disconnected therefrom when the elements of the mechanism are in the position shown in Figure 3. The lever 24 is connected by means of a short link 27 with a hand lever 28. The hand lever 28, as may be seen from Figure 1, extends rearwardly to a position in front of the drivers seat 29 so that the driver may readily operate this hand lever to steer the apparatus.

It is well known that the tractors are provided with power take-offs to which a driving pulley 30 may be attached (see Figure 1). Use is made of this pulley for operating the power steering mechanism by providing a belt 31 for connecting the driving pulley 30 with the driven pulley 22 and thus power is transmitted to the steering mechanism in a very simple manner without requiring any changes whatsoever in the tractor structure.

The frame 26, it will be noted from Figures 1 and 3 is positioned above the tractor and is attached to the side frame bars. This frame rigidly carries the major portion of the power steering mechanism as is apparent from the figures mentioned. The only other change required is to provide a worm and worm wheel connection with the front vertical shaft 3 or king pin.

In using this apparatus, the operator swings the lever 28 in the direction in which he intends travelling and thus connects the appropriate bevel pinion with the shaft 19. The bevel pinion rotates the bevel gear 14 and drives the shaft 12, motion of this shaft being transmitted to the worm 8. The worm 8, consequently, moves the worm wheel 7 or segmental gear, and when the desired amount of motion has been imparted, the lever 28 is again manipulated. In this manner, it is easy to control the apparatus and to steer it by power.

Further, it is to be noted also that in the event that the operator so desires, he may steer it by the manually operable hand wheel 18 (see Figure 3).

It will be seen, therefore, that this invention provides means whereby a simple, easily positioned steering mechanism may be attached to the power take-off shaft of the tractor by applying a pulley thereto and operatively connecting with the steering mechanism, as described.

It will be seen, therefore, that a very simple type of power steering mechanism has been provided by this invention which may be easily applied to implements attached to tractors, so that the implement or apparatus may be readily steered without, however, requiring any elaborate changes in either the tractor or the attachment thereto.

It will be seen further that the device is easy to operate and provides for both power steering and manual steering.

Although the invention has been described in considerable detail, such description is intended as illustrative rather than limiting as the invention may be variously embodied and as the scope of such invention is to be determined as claimed.

I claim:

The combination of a tractor having a driving shaft, a pulley carried by said shaft, side frame bars supporting said tractor and carried at their front and rear ends by a front wheel and rear wheels, a worm and worm wheel controlling the steering of the front wheel, an auxiliary frame attached to said side frame bars and extending over said tractor, a transverse shaft carried by said auxiliary frame and having a pair of loosely mounted bevel pinions thereon and having a rigidly mounted driven pulley, a belt joining the driven and driving pulley, a forwardly extending shaft operatively coupled to said worm and having a bevel gear thereon meshing with each of said bevel pinions, said bevel pinions being located on opposite sides of the center of said bevel gear, clutch means for connecting either bevel pinion to said transverse shaft, and a manually operable rearwardly extending lever controlling said clutch mechanism, and manually operable means for driving said forwardly extending shaft, and reduction gearing between said manually operable means and said forwardly extending shaft, whereby the apparatus may be steered either by power mechanism or by manual means.

In testimony that I claim the foregoing I have hereunto set my hand at Milwaukee, in the county of Milwaukee and State of Wisconsin.

EDWARD C. MYERS.